United States Patent
Sandell et al.

(10) Patent No.: US 12,104,775 B2
(45) Date of Patent: Oct. 1, 2024

(54) LIGHTING SYSTEM WITH IMPROVED SENSOR CONTROL

(71) Applicant: ABL IP Holding LLC, Atlanta, GA (US)

(72) Inventors: Donald Robert Sandell, San Jose, CA (US); Timothy Edward Monroe, Lincoln, CA (US)

(73) Assignee: ABL Holding Holding LLC, Atlanta, GA (US)

( * ) Notice: Subject to any disclaimer, the term of this patent is extended or adjusted under 35 U.S.C. 154(b) by 0 days.

(21) Appl. No.: 17/492,922

(22) Filed: Oct. 4, 2021

(65) Prior Publication Data

US 2023/0107396 A1    Apr. 6, 2023

(51) Int. Cl.
*F21V 23/04* (2006.01)
*F21S 8/00* (2006.01)
*F21V 5/04* (2006.01)
*H05B 47/11* (2020.01)
*H05B 47/13* (2020.01)

(52) U.S. Cl.
CPC .......... *F21V 23/0464* (2013.01); *F21V 5/045* (2013.01); *F21V 23/0471* (2013.01); *H05B 47/11* (2020.01); *H05B 47/13* (2020.01); *F21S 8/003* (2013.01)

(58) Field of Classification Search
CPC .. F21V 5/045; F21V 23/0464; F21V 23/0471; F21S 8/003; H05B 47/11; H05B 47/13
See application file for complete search history.

(56) References Cited

U.S. PATENT DOCUMENTS

| | | | |
|---|---|---|---|
| 5,649,761 A * | 7/1997 | Sandell | F21V 23/0471 |
| | | | 362/802 |
| D410,863 S | 6/1999 | Hasegawa et al. | |
| D465,050 S | 10/2002 | Crelin | |
| 6,781,129 B2 * | 8/2004 | Leen | G08B 13/193 |
| | | | 362/276 |

(Continued)

FOREIGN PATENT DOCUMENTS

CN     304302664     9/2017

OTHER PUBLICATIONS

Good Earth Lighting, Available online at https://www.lowes.com/pd/Good-Earth-Lighting-180-Degree-400-Lumen-Bronze-Integrated-LED-Motion-Activated-Flood-Light-with-Timer/1000940366, 2020, 5 pages.

(Continued)

*Primary Examiner* — Arman B Fallahkhair
(74) *Attorney, Agent, or Firm* — Kilpatrick Townsend & Stockton LLP

(57) ABSTRACT

A lighting system, including but not limited to security lighting systems, includes a light fixture having a housing and a light source supported on the housing. The light fixture may include an adjuster that is adjustable to control both an output level of the light source and an external light level at which the light source is activated. Additionally or alternatively, the light source may be a first light source, and the light fixture may include a second light source and a motion sensor housed within an installation cavity of the housing and behind an optic of the light fixture. The first light source may be supported on the housing outside of the installation cavity.

10 Claims, 12 Drawing Sheets

(56) References Cited

U.S. PATENT DOCUMENTS

| | | | |
|---|---|---|---|
| D553,783 S | 10/2007 | Loftus et al. | |
| D561,369 S | 2/2008 | Sandell | |
| 7,543,958 B2 * | 6/2009 | Chi | F21V 23/0442 |
| | | | 362/276 |
| D764,700 S | 8/2016 | Chen | |
| D773,100 S | 11/2016 | Guercio et al. | |
| 9,681,516 B2 * | 6/2017 | Clark | H05B 45/20 |
| 9,820,350 B2 | 11/2017 | Pyshos et al. | |
| 9,892,693 B1 | 2/2018 | Kumar et al. | |
| D823,521 S | 7/2018 | Lehman et al. | |
| D827,184 S | 8/2018 | Brennenstuhl et al. | |
| 10,117,300 B2 | 10/2018 | Doheny et al. | |
| D835,834 S | 12/2018 | Paredes | |
| D836,230 S | 12/2018 | Guercio et al. | |
| 10,163,405 B2 | 12/2018 | Kumar et al. | |
| D840,577 S | 2/2019 | Lehman et al. | |
| D847,404 S | 4/2019 | Paredes | |
| 10,299,321 B1 | 5/2019 | Trask et al. | |
| D872,343 S | 1/2020 | Lehman et al. | |
| D875,990 S | 2/2020 | Zeng | |
| D897,587 S | 9/2020 | Liu | |
| D900,379 S | 10/2020 | Mclaughlin | |
| D914,944 S | 3/2021 | Gowing | |
| 11,170,955 B2 * | 11/2021 | Cho | H01H 13/585 |
| 11,346,514 B2 * | 5/2022 | Paredes | F21V 23/06 |
| D956,337 S | 6/2022 | Mclaughlin | |
| D995,860 S | 8/2023 | Dahan | |
| 2018/0116029 A1 | 4/2018 | Pyshos et al. | |
| 2018/0166026 A1 | 6/2018 | Kumar et al. | |
| 2018/0310381 A1 | 10/2018 | Bowen et al. | |
| 2018/0368232 A1 | 12/2018 | Doheny et al. | |
| 2019/0027099 A1 | 1/2019 | Kumar et al. | |
| 2019/0088213 A1 | 3/2019 | Kumar et al. | |

OTHER PUBLICATIONS

OVFL 2RH Floodlight, 2-Head LED Security Floodlight, Lithonia Lighting, Available online at https://www.acuitybrands.com/products/detail/802563/lithonia-lighting/ovfl-2rh-floodlight/2-head-led-security-floodlight, 2016, 2 pages.

"LEPOWER 3000LM LED Flood Light Outdoor, Switch Controlled LED Security Light, 28W Exterior Lights with 2 Adjustable Heads, 5500K, IP65 Waterproof for Garage, Yard, Patio", Available online at: https://www.amazon.com/LEPOWER-Controlled-Security-Adjustable-Waterproof/dp/B083DDLYCR/?th=1, Jan. 1, 2020, 10 pages.

"Lithonia Lighting HGX LED 2SH ALO SWW2 120 PE DDB M2 HomeGuard LED Outdoor Security Floodlight, Adjustable Light Output, Switchable CCT, Photocell, 2-Lights, Bronze", Available online at: https://www.amazon.com/Lithonia-Lighting-HGX-LED-SWW2/dp/B09KNRRMWP/?th=1, Oct. 29, 2021, 9 pages.

CA3,178,054 , "Office Action", Mar. 28, 2024, 3 pages.

U.S. Appl. No. 29/810,270, "Ex-Parte Quayle Action", Dec. 21, 2023, 5 pages.

U.S. Appl. No. 29/810,270, "Notice of Allowance", Apr. 11, 2024, 6 pages.

CA211564, "Office Action", Feb. 8, 2024, 1 page.

CA227512, "Office Action", Feb. 8, 2024, 1 page.

\* cited by examiner

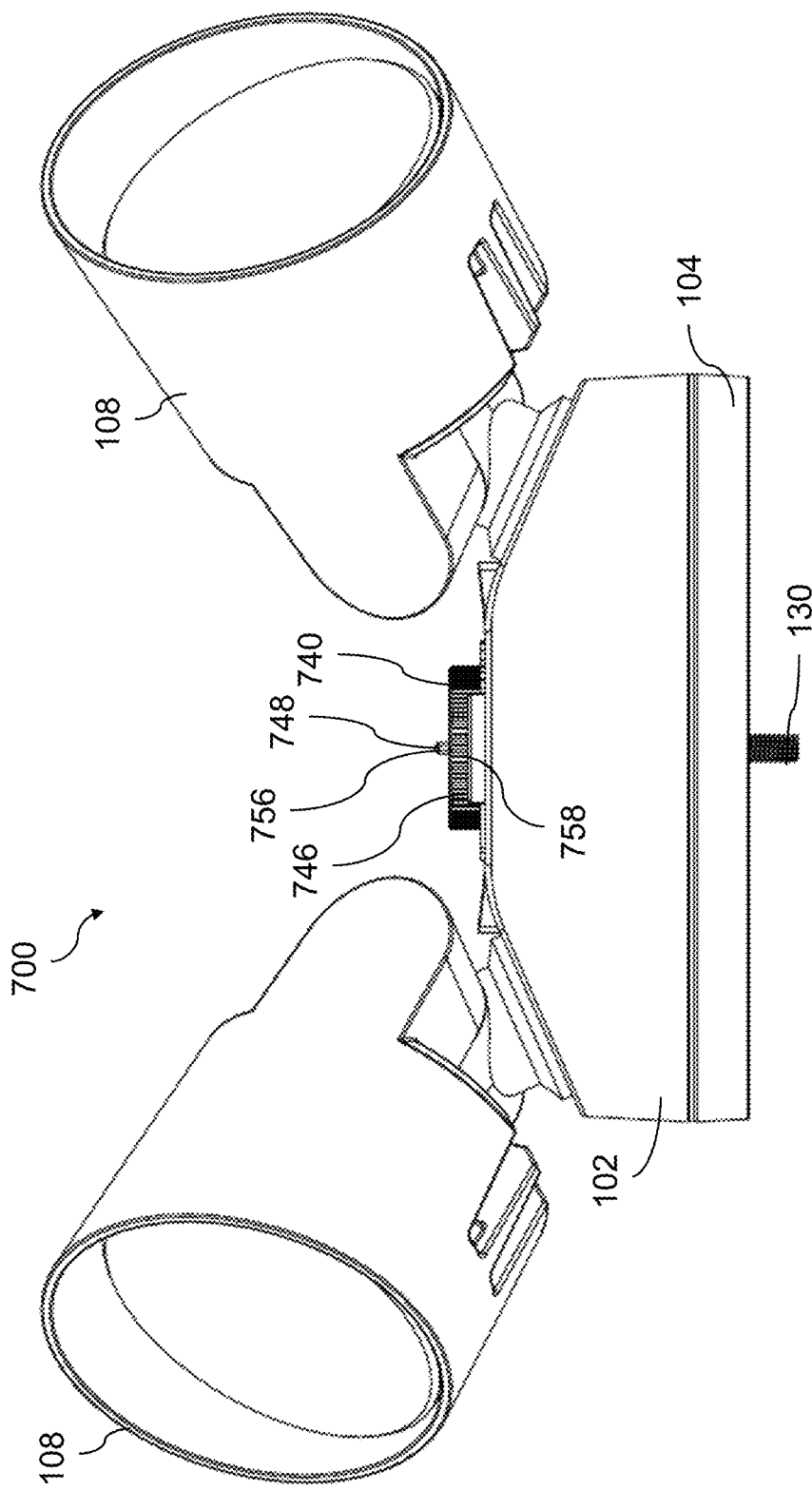

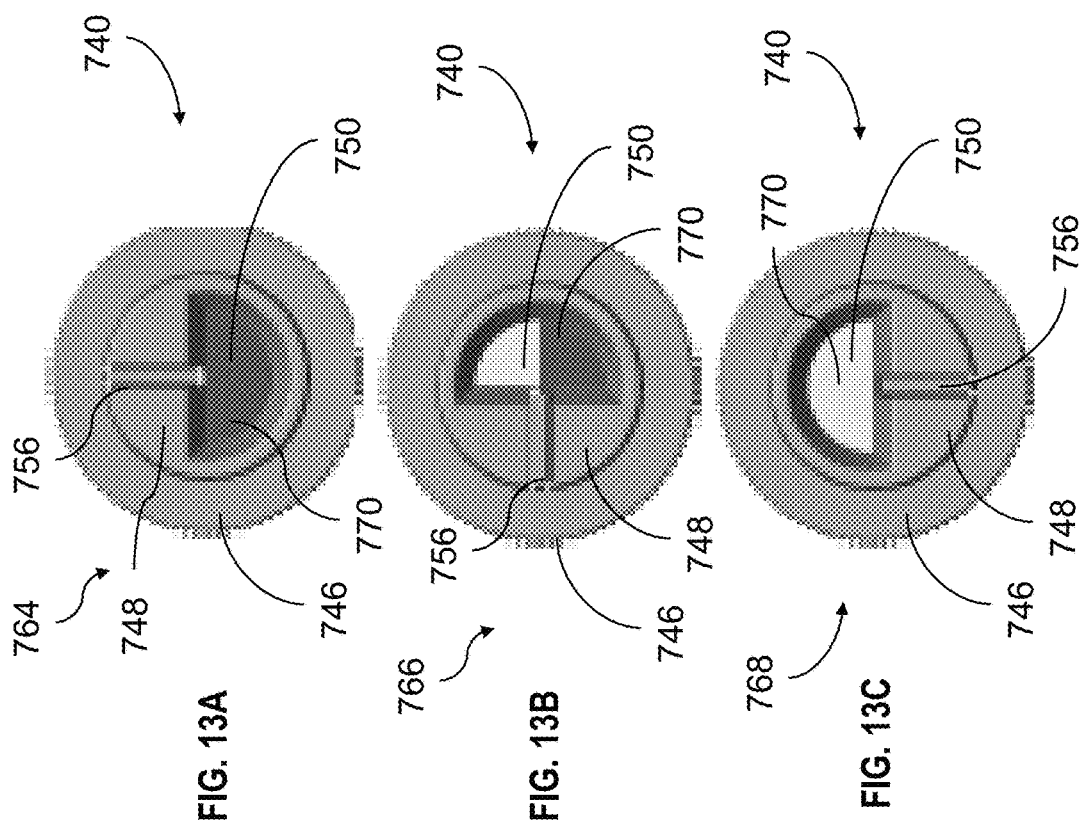
FIG. 13A
FIG. 13B
FIG. 13C
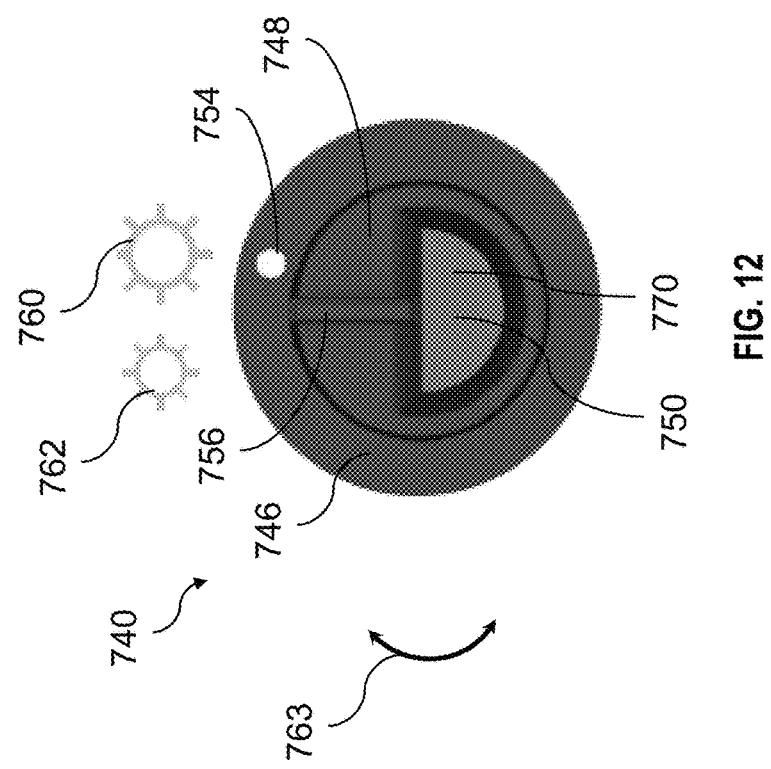
FIG. 12

LIGHTING SYSTEM WITH IMPROVED SENSOR CONTROL

FIELD OF THE INVENTION

This application relates to lighting systems, including but not limited to security lighting systems, and, more particularly, to lighting systems capable of operating in different modes.

BACKGROUND

Many public places often including lighting systems with light fixtures that are controlled using manual switches. Although manual switches can control the light fixtures, they require a physical interaction with a user to be controlled, which may be inconvenient in certain environments. Some light fixtures may include limited sensors for intelligent control, but traditionally such light fixtures are susceptible to failure due to the number of sensors and the exposure of each sensor to environmental conditions such as water vapor.

SUMMARY

The terms "invention." "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments, a light fixture includes a housing and a light source supported on the housing, where the light source is capable of having at least two output levels. The light fixture also includes a sensor on the housing for detecting an amount of light external to the light fixture and generating an activation signal for the light source based on the detected light being within a predefined activation range. In certain aspects, the predefined activation range is adjustable. The light fixture may also include an adjuster on the housing and communicatively coupled to the light source and the sensor. The adjuster includes a first adjustment dial configured to control the output level of the light source and a second adjustment dial configured to control the activation range of the sensor.

According to various embodiments, a light fixture includes a housing having an installation cavity, where the installation cavity includes an opening. The light fixture includes a first light source supported on the housing and outside of the installation cavity and a second light source supported within the installation cavity. The light fixture also includes a motion sensor supported within the installation cavity, and an optic connected to the housing and covering the opening of the installation cavity.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 8 is a bottom view of the light fixture of FIG. 7.

FIG. 12 illustrates an adjuster of the light fixture of FIG. 7 and movement of a first adjustment dial of the adjuster.

FIGS. 13A-C illustrate the adjuster of the light fixture of FIG. 7 and movement of a second adjustment dial of the adjuster.

DETAILED DESCRIPTION

Figure 1:
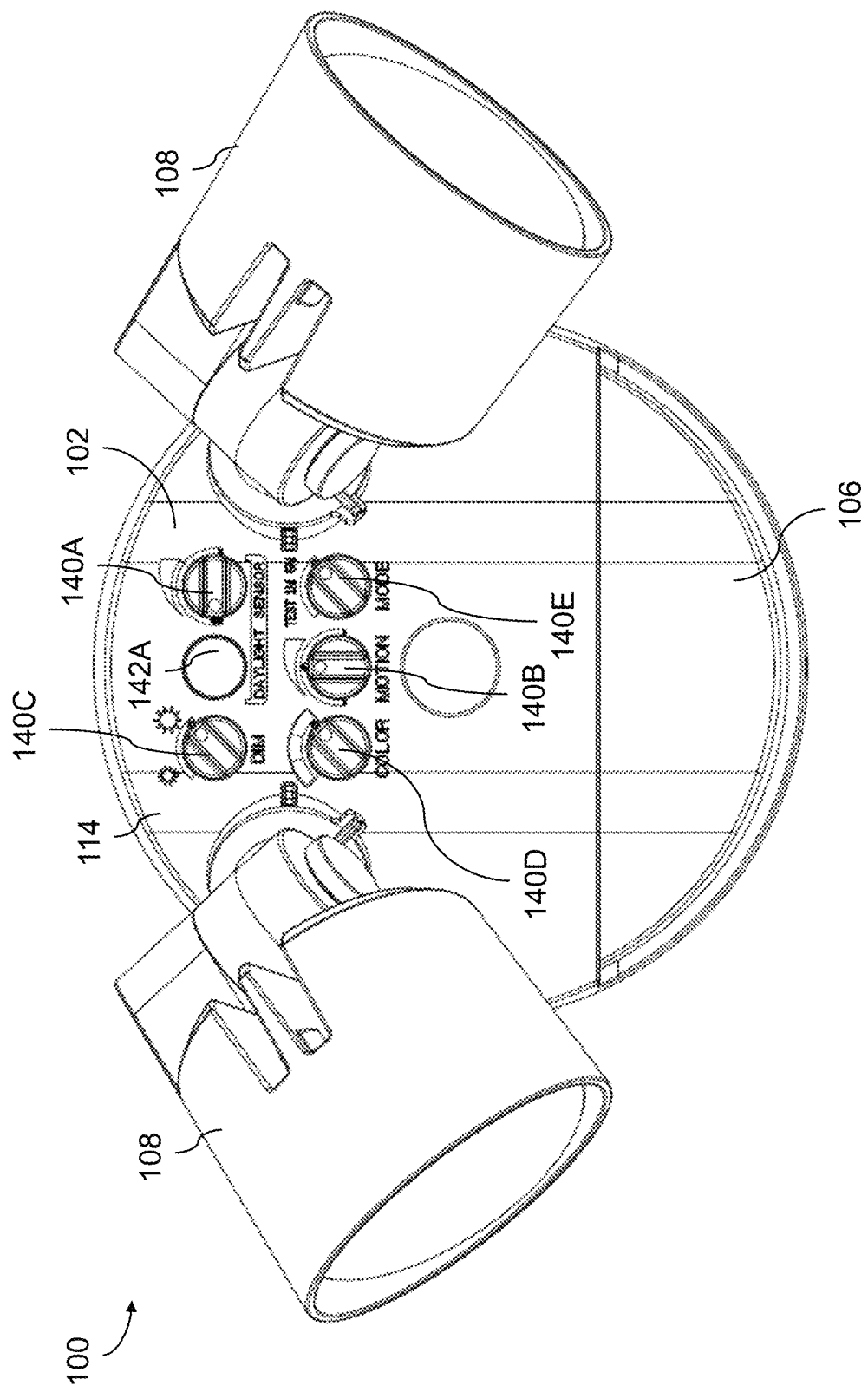
FIG. 1 is a front view of a light fixture according to embodiments of the disclosure.
Figure 2:
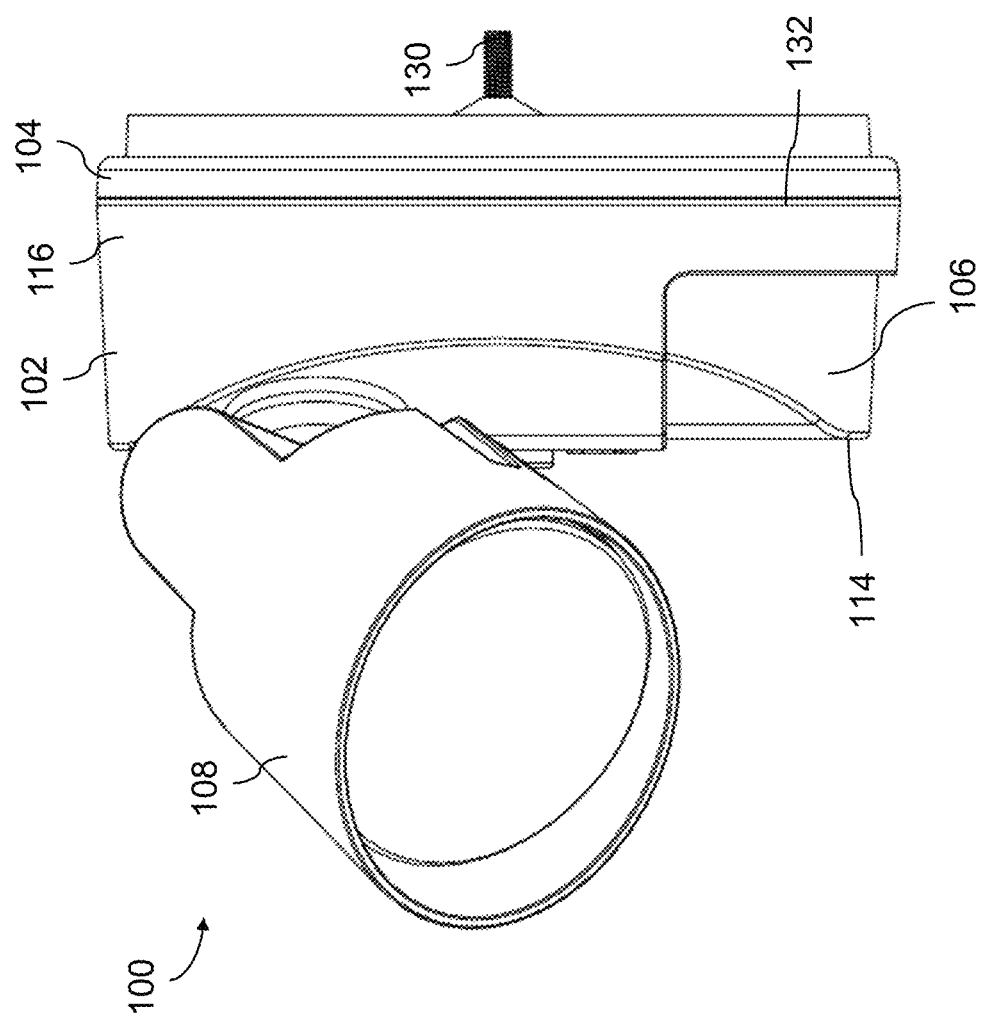
FIG. 2 is a side view of the light fixture of FIG. 1.
Figure 3:
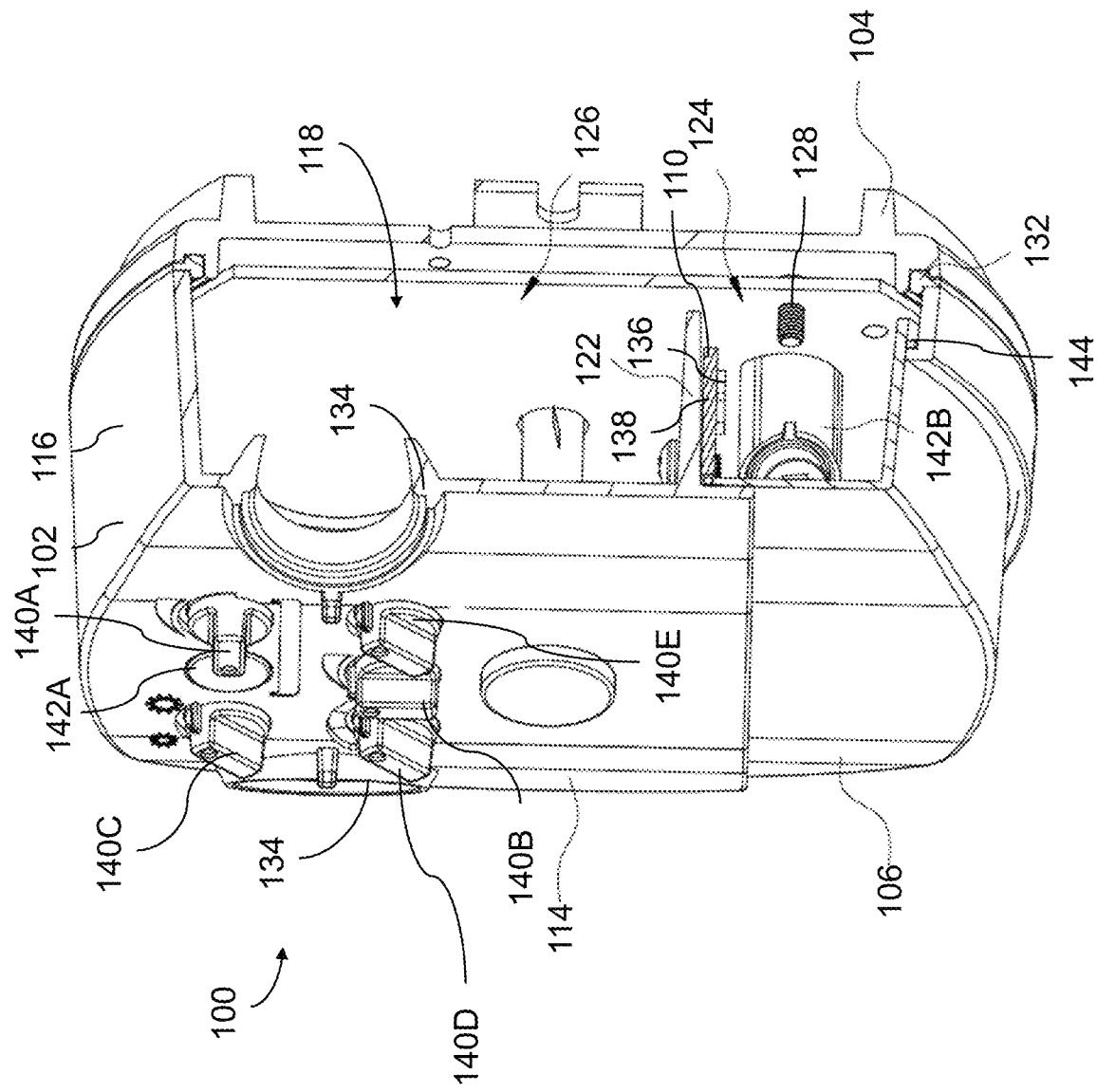
FIG. 3 illustrates the light fixture of FIG. 1 with light modules removed and with a housing and an optic partially cut away such that internal components are visible.
Figure 4:
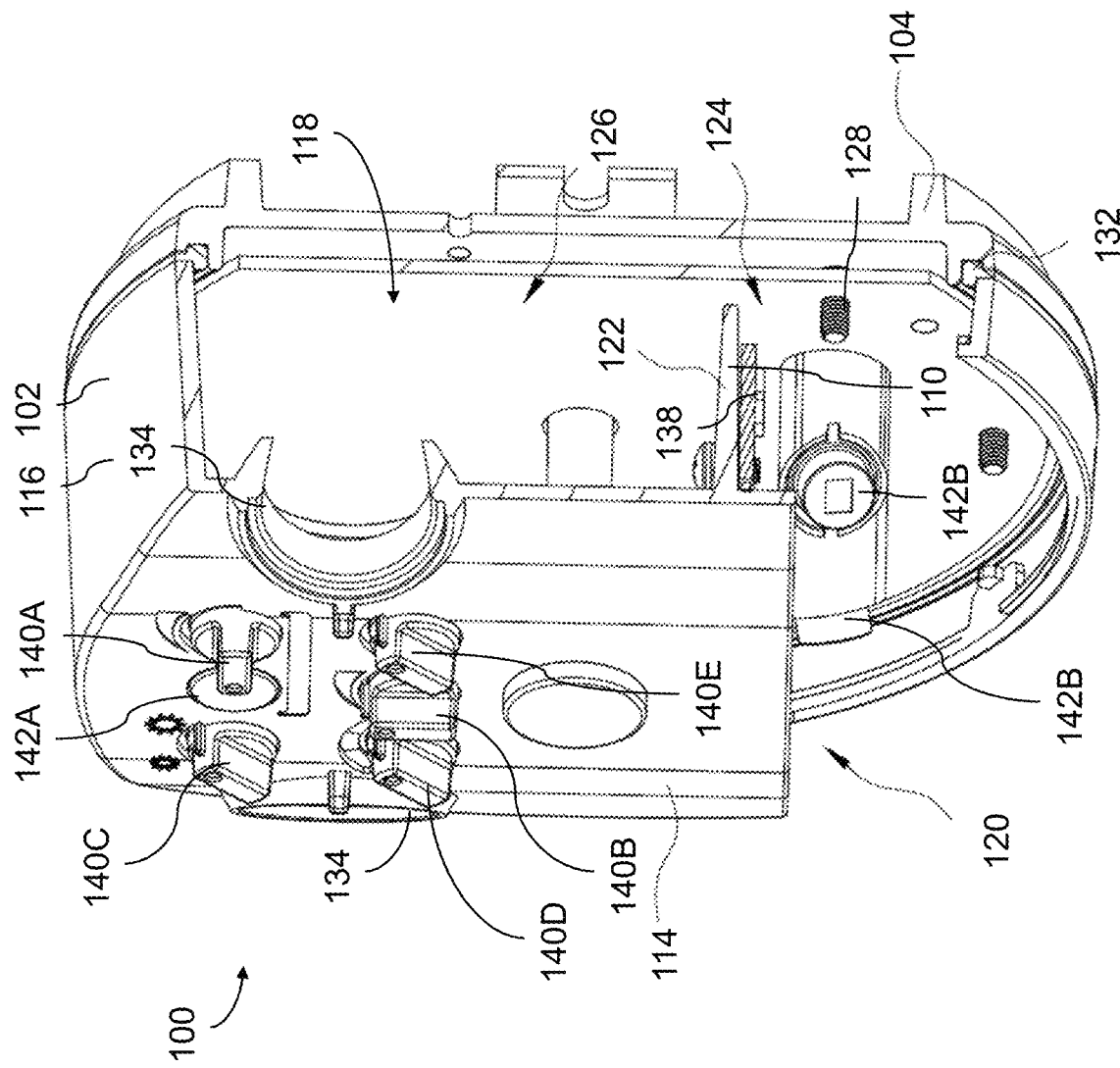
FIG. 4 is the view of FIG. 3 with the optic removed.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up." "down," "top," "bottom." "left." "right," "front," and "back," among others are intended to refer to the orientation as illustrated and described in the figure (or figures) to which the components and directions are referencing.

Described herein are light fixtures for lighting systems, including but not limited to security lighting systems. The light fixtures described herein include one or more sensors and/or adjusters for controlling an aspect of the light fixture, including but not limited to an output level or brightness of one or more light sources, an activation time based on external light, a color temperature of one or more light sources, combinations thereof, or other aspects as desired. In certain aspects, the light fixtures described herein may minimize and/or eliminate exposure of sensors and/or adjusters of the light fixture to an external environment in which the light fixture is installed. As a non-limiting example, the light fixtures described herein may minimize potential access areas for water into the light fixture. Various other benefits may be realized with the light fixtures described herein, and the aforementioned examples should not be considered limiting. While reference is made herein to the light fixture systems being security light fixtures or floodlight fixtures mounted on a wall, they are by no means limited, and may be other types of light fixtures as desired and/or mounted or otherwise supported on other surfaces or structures as desired.

FIGS. 1-6 illustrate an example of a light fixture 100 according to various embodiments.

The light fixture 100 of FIGS. 1-6 is a security light fixture or a floodlight fixture, although it need not be in other embodiments. The light fixture 100 includes a housing 102, a base 104, an optic 106, one or more light modules 108 each with a first light source (not visible in FIGS. 1-6), a second light source 110, one or more sensors, one or more adjusters for the one or more sensors and/or the light sources, electronics such as drivers, controllers, and/or power sources, various sub-combinations thereof, and/or other components and/or features as desired.

As best illustrated in FIGS. 2-6, the housing 102 includes a front wall 114 and a perimeter wall 116 that together define an installation cavity 118. Optionally, and as discussed in detail below, an opening 120 providing access to the installation cavity 118 may be at least partially defined by the front wall 114 and/or the perimeter wall 116. A support 122 may optionally extend from the front wall 114 into the installation cavity 118 that divides the installation cavity 118 into a first installation space 124 and a second installation space 126. As discussed in detail below, various components of the light fixture 100 may be housed within the installation cavity 118, including but not limited to a sensor for the light fixture 100, the second light source 110, and/or electronics of the light fixture 100.

When the opening 120 is included, the optic 106 may be coupled to the housing 102 so as to extend over the opening 120. The optic 106 may at least enclose the installation cavity 118 when installed. Optionally, a sealing member 144 may be provided between the optic 106 and the housing 102 such that the opening 120 is sealed to limit or prevent the intrusion of material such as water, debris, etc. into the installation cavity 118. In other embodiments, the opening 120 may be sealed by the optic 106 without requiring the sealing member 144, and in further embodiments, the opening 120 need not be sealed. The optic 106 may control the appearance of light emitted from the second light source 110 within the installation cavity 118. In some non-limiting examples, the optic 106 may be fresnel optic or other suitable type of optic as desired.

Figure 6:
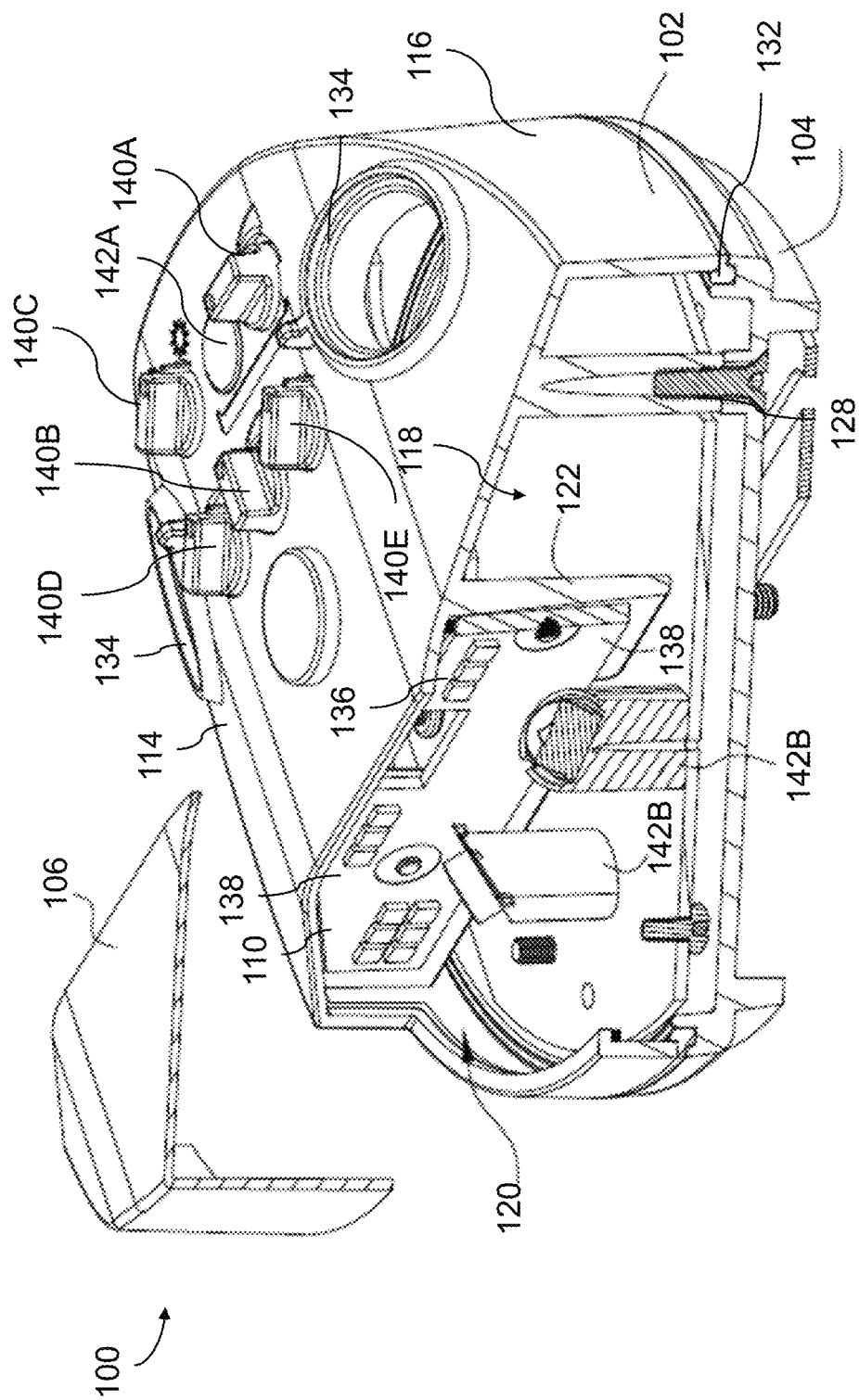
FIG. 6 is another view of the light fixture of FIG. 1 with the light modules removed and a portion of the housing and optic partially cut away.
Figure 7:
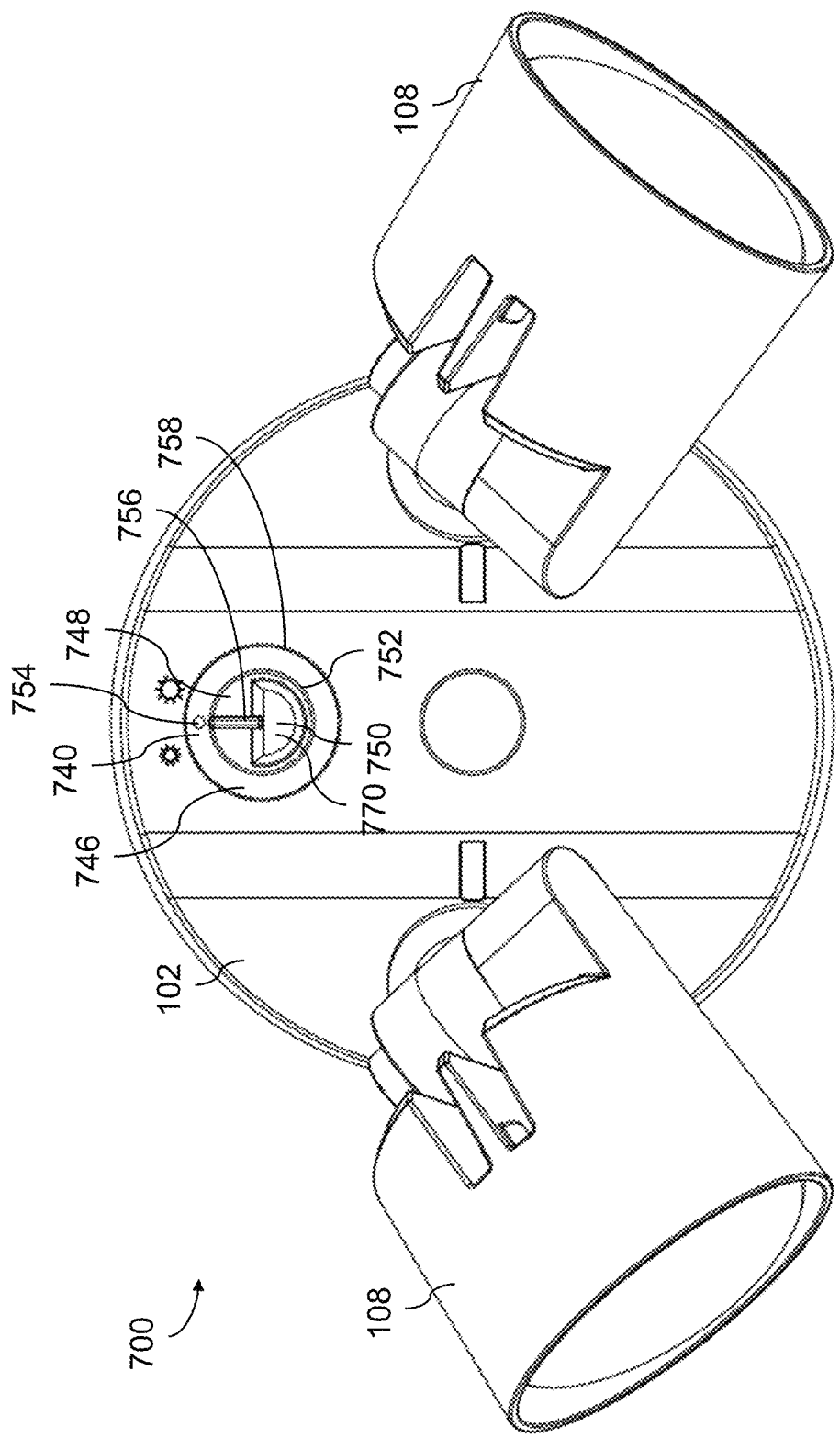
FIG. 7 is a front view of a light fixture according to embodiments of the disclosure.
Figure 10:
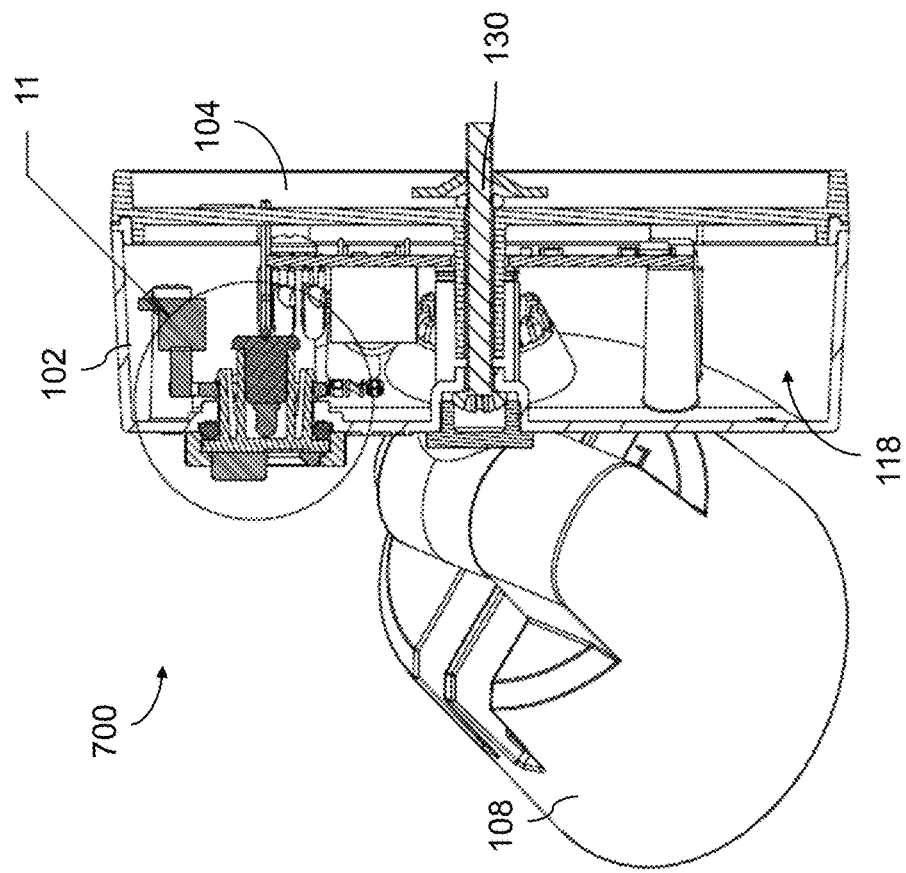
FIG. 10 is a sectional view of the light fixture of FIG. 7.
Figure 9:
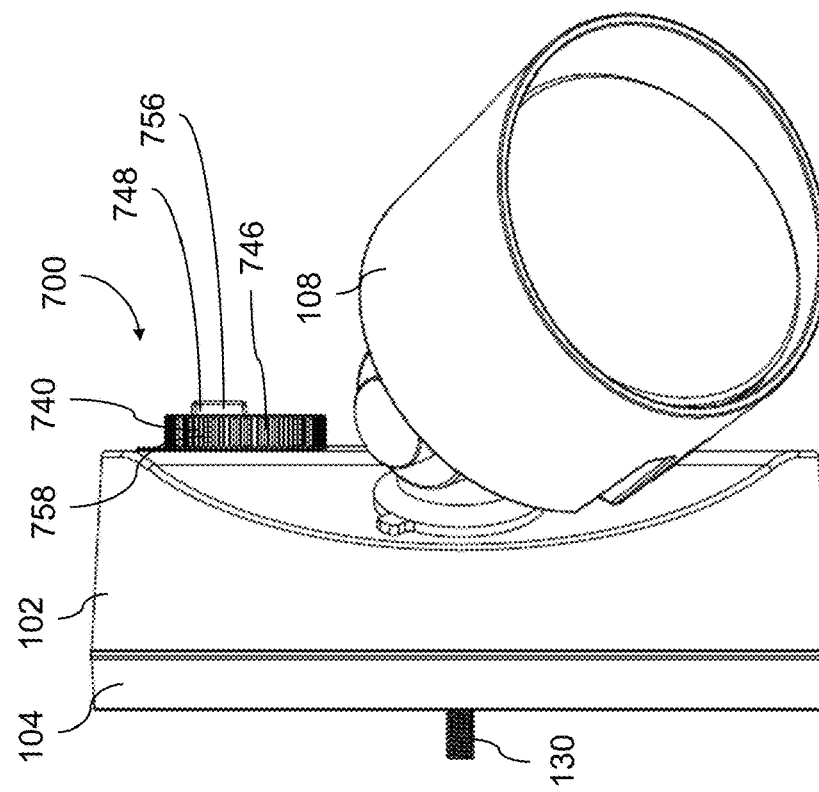
FIG. 9 is a side view of the light fixture of FIG. 7.

The housing 102 may be connected to the base 104 via various suitable mechanisms as desired, including but not limited to fasteners 128. The base 104 may enable the light fixture 100 to be mounted or otherwise supported on a surface or other structure as desired. In certain embodiments, the base 104 may accommodate a support fastener 130 that may be used to secure the light fixture 100 at a desired location. As best illustrated in FIG. 6, the base 104 connected to the housing 102 may enclose the installation cavity 118 opposite from the front wall 114. Optionally, a sealing member 132, including but not limited to a sealing gasket or other suitable device or mechanism, may be provided between the housing 102 and the base 104 such that the installation cavity 118 is sealed. In certain embodiments, the seal provided by the sealing member 132 may limit or prevent the intrusion of material such as water, debris, etc. into the installation cavity 118.

The light modules 108 of the light fixture 100 may be attached to the housing 102 at various support locations 134 outside of the installation cavity 118. The number of light modules 108 and/or support locations 134 illustrated, as well as the particular support locations 134 on the housing 102, should not be considered limiting on the disclosure. In certain embodiments, the light modules 108 may be fixed relative to the housing 102 (see, e.g., FIG. 15); however, in other embodiments, the light modules 108 may be movable (e.g., rotatable, pivotable, tiltable, etc.) relative to the housing 102 such that an angle or orientation of the light modules 108 relative to the housing 102 can be controlled as desired. In the embodiment of FIGS. 1-6, the light modules 108 are adjustable relative to the housing 102.

The light modules 108 may include one or more first light sources that are outside of the installation cavity 118. The light sources of the light modules 108 may be various types of light sources as desired. In some embodiments, the light sources include light emitting diodes ("LEDs") mounted on a printed circuit board ("PCB") and wired to the PCB. Any number of LEDs and/or PCBs may be utilized. Each PCB may have wiring for connecting to a driver, which can be shared between PCBs or each PCB may have its own power supply. The LEDs may be single-die or multi-die LEDs, DC or AC, or can be organic light emitting diodes. White, color, or multicolor LEDs may be used. Moreover, the LEDs mounted on a PCB need not all be the same color: rather, mixtures of LEDs may be used. In other embodiments, light sources other than LEDs may be utilized. As discussed in detail below, one or more characteristics of the first light sources may optionally be adjustable or controllable as desired such that the light modules 108 provide a desired light distribution.

As best illustrated in FIGS. 3-6, the one or more second light sources 110 may optionally be supported within the installation cavity 118 of the housing 102. In some examples, the second light sources 110 are supported in the first installation space 124 of the installation cavity 118. The number and location of second light sources 110 within the installation cavity 118 should not be considered limiting on the disclosure. Similar to the first light sources, the second light sources 110 may be various types of light sources as desired. In the embodiment of FIGS. 1-6, the second light sources 110 are LEDs 136 supported on a PCB 138. In some embodiments, the PCB 138 may be supported on the support 122 using various suitable mechanisms or devices as desired, although in other embodiments the PCB 138 may be supported at other locations as desired. In some non-limiting examples, a light output of the second light sources 110 may be less than the light output of the first light sources. As one non-limiting example, the first light sources may be suitable for floodlights or security lights and the second light sources 110 may be suitable for a night light or lower intensity light distribution.

In some embodiments, the first light sources of the light modules 108 and/or the second light sources 110 may have one or more adjustable characteristics such that the light modules 108 and/or the second light sources 110 may provide a desired light distribution as desired. As one non-limiting example, the light modules 108 and/or the second light sources 110 may be capable of displaying (and adjustable to display) a plurality of color temperatures. As a non-limiting example, the light sources of the light modules 108 may be capable of displaying color temperatures in a range of 2700K to 5000K, inclusive. In other embodiments, the color temperatures may be less than 2700K and/or greater than 5000K as desired. As another non-limiting example, the light modules 108 and/or the second light sources 110 may be capable of providing a plurality of output levels (i.e., the light sources are dimmable and the brightness is adjustable). As a further non-limiting example, the light modules 108 and/or the second light sources 110 may be selectively activated responsive to one or more conditions detected by an associated sensor, including but not limited to a detected motion (e.g., motion sensor), a detected external light level, etc. As an additional non-limiting example, the light modules 108 and/or the second light sources 110 may be capable of operating in different modes, including but not limited to a flashing or blinking mode, an always on mode, etc.

Figure 5:
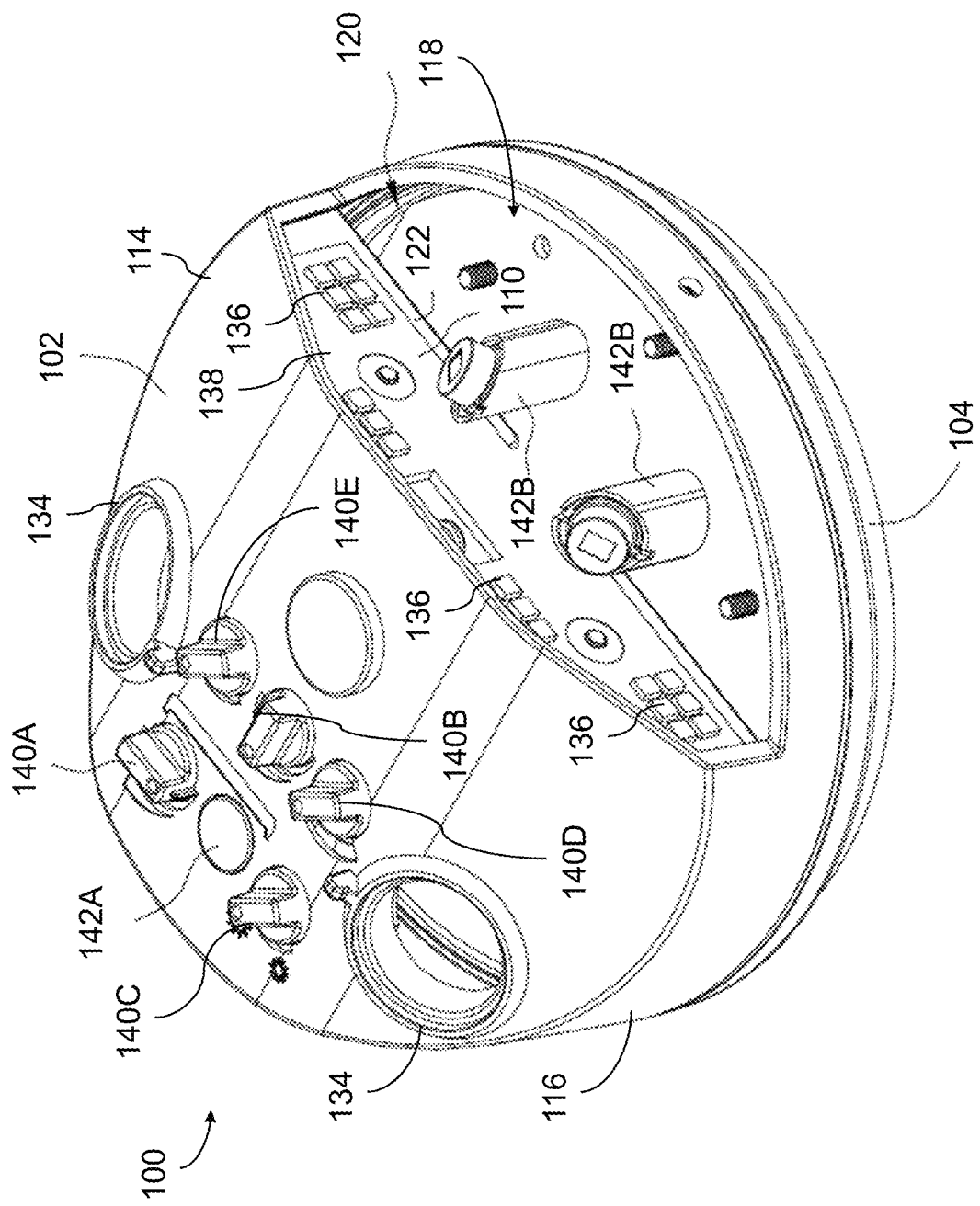
FIG. 5 is a perspective view of the light fixture of FIG. 1 with the light modules removed.

Depending on the desired adjustment of the light modules 108 and/or the second light sources 110, one or more adjusters 140 and/or one or more sensors 142 may be provided on the light fixture 100 and that are communicatively coupled with at least one of the light modules 108 or the second light sources 110. Optionally, and as best illustrated in FIGS. 3-6, one or more sensors 142 that control the first light sources and/or the second light sources 110 may be provided within the installation cavity 118. While two sensors 142 are illustrated in the installation cavity 118 in FIGS. 3-6, in other embodiments, any number of sensors 142 may be provided within the installation cavity 118 as desired. In certain embodiments, and as best illustrated in FIGS. 5 and 6, the sensors 142 are supported at locations that minimize or eliminate interference with light emitted from the second light sources 110. In such embodiments, the presence of the sensors 142 may be hidden to an observer when the optic 106 is installed (discussed below). The sensors 142 within the installation cavity 118 with the second light sources 110 may also minimize exposure of the sensors 142 to the external environment of the light fixture 100.

In the embodiment of FIGS. 1-6, the light fixture 100 includes a light sensor 142A that detects an amount (e.g., brightness) of light external to the light fixture 100 and sends an activation signal to the second light sources 110 (or enables activation of the second light sources 110) based on the detected light being within a predefined range. As an example, the predefined range may be a daytime brightness range, a night brightness range, or a dusk-til-dawn brightness range. In this embodiment, the light sensor 142A may be various types of sensors suitable for detecting the external light, including but not limited to a photocell sensor. As a non-limiting example of the light fixture 100 using the light sensor 142A, the light sensor 142A may determine and detect low light levels (e.g., at dusk), and based on this detection activate the light sources 110. Based on the detection of increased light levels (e.g., in the morning), the light fixture 100 turns off the light sources 110.

The light fixture 100 of FIGS. 1-6 also includes motion sensors 142B that detect a motion or movement and send an activation signal to the light modules 108 (or enable activation of the light modules 108) based on the detected motion. In certain embodiments, the motion sensors 142B may additionally or alternatively send an activation signal to the light modules 110. In such embodiments, if the light modules 110 are already on, the activation signal may include changing at least one characteristic of the light modules 110, including but not limited to increasing the brightness, intensity, and/or color of the light emitted from the light modules 110. In the embodiment of FIGS. 1-6, the motion sensors 142B are supported within the installation cavity 118. In other embodiments, the light sensor 142A (and/or other sensors) may be supported in the installation cavity 118 in addition to or in place of the motion sensors 142B. In the embodiment illustrated, the motion sensors 142B may provide various coverage angles relative to the light fixture 100 to provide desired ranges of sensing. As a non-limiting example, each motion sensor 142B may provide a coverage angle 110°, and together the two motion sensors 142B may provide 180° relative a surface or structure on which the light fixture 100 is mounted. As a non-limiting example of the light fixture 100 using the motion sensors 142B, light fixture 100 may be mounted such that the motion sensors 142B monitor a particular location relative to the light fixture 100 for motion or movement (e.g., due to a person, animal, vehicle, etc.). Based on a detected movement and/or movement meeting a threshold level, the motion sensors 142B send an activation signal to the light modules 108 and/or the light modules 110 to activate the light and/or change at least one characteristic of the light emitted.

In other embodiments, the light fixture 100 may include additional or alternative sensors 142 or combinations of sensors 142 as desired.

As mentioned, the light fixture 100 may also include one or more adjusters 140. In the embodiment of FIGS. 1-6, the light fixture 100 includes an activation adjuster 140A that is communicatively coupled to the light sensor 142A to control the light sensitivity of the light sensor 142A and thus the range of light at which second light sources 110 are activated. In some non-limiting examples, the activation adjuster 140A may be adjusted to a daytime range, a night range, or a dusk-til-dawn range such that the light sensor 142A sends the activation signal based on the detected light being within the selected range.

The light fixture 100 of FIGS. 1-6 also includes a motion adjuster 140B that is communicatively coupled to the motion sensors 142B to control the motion sensitivity of the motion sensors 142B and thus the amount of motion that will cause activation of the light modules 108. In some cases, the motion adjuster 140B may be adjusted to control the sensing range (e.g., distance) of the motion sensors 142B from the light fixture 100. As a non-limiting example, the motion adjuster 140B may be adjusted to control the sensing range of the motion sensors 142B to be from 2 meters to 15 meters. In other embodiments, the motion adjuster 140B may control the sensitivity of the motion sensors 142B as desired.

In addition to the activation adjuster 140A and the motion adjuster 140B, the light fixture 100 includes a brightness (or dimming) adjuster 140C, a color temperature adjuster 140D, and a mode adjuster 140E. In this embodiment, the brightness adjuster 140C is communicatively coupled to the light modules 108 and is adjustable to control the lumen output of the light modules 108 between at least two brightness levels (e.g., full brightness and 50% brightness). The color temperature adjuster 140D is communicatively coupled to the light modules 108 and is adjustable to control the color temperature of the light modules 108 between at least two different color temperatures (e.g., 3000K. 4000K, or 5000K). The mode adjuster 140E is communicatively coupled to the light modules 108 and the second light sources 110 to adjust the light fixture between at least two different modes (e.g., a testing mode and an active mode).

FIGS. 7-13C illustrate another example of a light fixture 700 according to various embodiments. The light fixture 700 is substantially similar to the light fixture 100 except that the housing 102 of the light fixture 700 omits the opening 120 to the installation cavity 118 and thus also omits the optic 106. However, in other embodiments, other light fixtures may include various combinations of features described herein, including fixtures that may include both the light sources 110, motion sensors 142B, and adjustment dial 740. Various other combinations or sub-combinations of features may be used in other light fixtures as desired. Compared to the light fixture 100 that included a plurality of individual adjusters 140, each of which is controllable to control an aspect of the light fixture 100, the light fixture 700 also includes a multi-functional adjustment dial 740 for controlling at least two aspects of the light fixture 700.

As best illustrated in FIGS. 7, 12, and 13A-C, the multi-functional adjustment dial 740 includes a first adjustment dial 746 configured to control a first aspect of the light fixture 700 between two or more settings and a second adjustment dial 748 configured to control a second aspect of the light fixture 700 between two or more settings. Optionally, the multi-functional adjustment dial 740 includes a sensor 750.

As illustrated, the first adjustment dial 746 surrounds at least a portion of an outer perimeter 752 of the second adjustment dial 748, and in some embodiments, the first adjustment dial 746 surrounds the entire outer perimeter 752 of the second adjustment dial 748. In some embodiments, the first adjustment dial 746 is rotatable independently from the second adjustment dial 748, although in other embodiments rotation of the first adjustment dial 746 may at least partially control rotation of the second adjustment dial 748.

In embodiments where the multi-functional adjustment dial 740 includes the sensor 750, the sensor may include a lens 770 in a portion of the second adjustment dial 748 and/or a portion of the second adjustment dial 748 may optionally be transparent such that the sensor 750 housed within the multi-functional adjustment dial 740 may detect at least one characteristic through the lens 770.

In some optional embodiments, the outermost adjustment dial (e.g., the first adjustment dial 746) may include a gripping feature 758 such as ridges or other suitable features that may be utilized by a user. Optionally, the first adjustment dial 746 includes an indicator 754 that indicates the particular setting that the first adjustment dial 746 is set to (e.g., by aligning with a visual indicator on the housing or otherwise providing a suitable indication). Similarly, the second adjustment dial 748 includes an indicator 756 that indicates the particular setting that the second adjustment dial 748 is set to. The indicator 754 and the indicator 756 may be a similar type of indicator in some embodiments, although they need not be in other embodiments.

In the embodiment of FIGS. 7-13C, the first adjustment dial 746 is communicatively coupled to the light modules 108 and is adjustable to control the lumen output of the light modules 108 between at least two brightness levels (e.g., full brightness and 50% brightness). FIG. 12 illustrates the multi-functional adjustment dial 740 with the first adjustment dial 746 having a first setting 760 and a second setting 762. In FIG. 12, rotation of the first adjustment dial 746 between the first setting 760 and the second setting 762 is represented by arrow 763.

In the embodiment of FIGS. 7-13C, the sensor 750 is a light sensor that detects an amount (e.g., brightness) of light external to the light fixture 700. The sensor 750 may send an activation signal to the light modules 108 and/or may enable activation of the light modules 108 based on the detected light being within a predefined range. In some embodiments, the sensor 750 may optionally be a photocell sensor. In the embodiment illustrated in FIGS. 7-13C, the second adjustment dial 748 is communicatively coupled to the sensor 750 to control the light sensitivity of the light sensor 750 and thus the range of light at which the light modules 108 are activated or can be activated. FIGS. 13A-C illustrate the multi-functional adjustment dial 740 with the second adjustment dial 748 having a first setting 764 (FIG. 13A), which may be a daytime setting enabling activation when the detected light is in a daytime range: a second setting 766 (FIG. 13B), which may be a dusk-til-dawn setting enabling activation when the detected light is in a dusk-til-dawn range less than the daytime range: and a third setting 768 (FIG. 13C), which may be a night setting enabling activation when the detected light is in a night range less than the dusk-til-dawn range.

In other embodiments, the first adjustment dial 746 and/or the second adjustment dial 748 may control other aspects of the light fixture 700 as desired, including but not limited to a color temperature, a mode, various other aspects of the light fixture 700 as desired, and various other combinations thereof. Likewise, the sensor 750 may be other sensors for the light fixture 700 as desired that may optionally be adjusted via the first adjustment dial 746 and/or the second adjustment dial 748. As a non-limiting example, in other embodiments, the sensor 750 may be a motion sensor, and the first adjustment dial or the second adjustment dial may adjust a sensitivity of the motion sensor.

Figure 11:
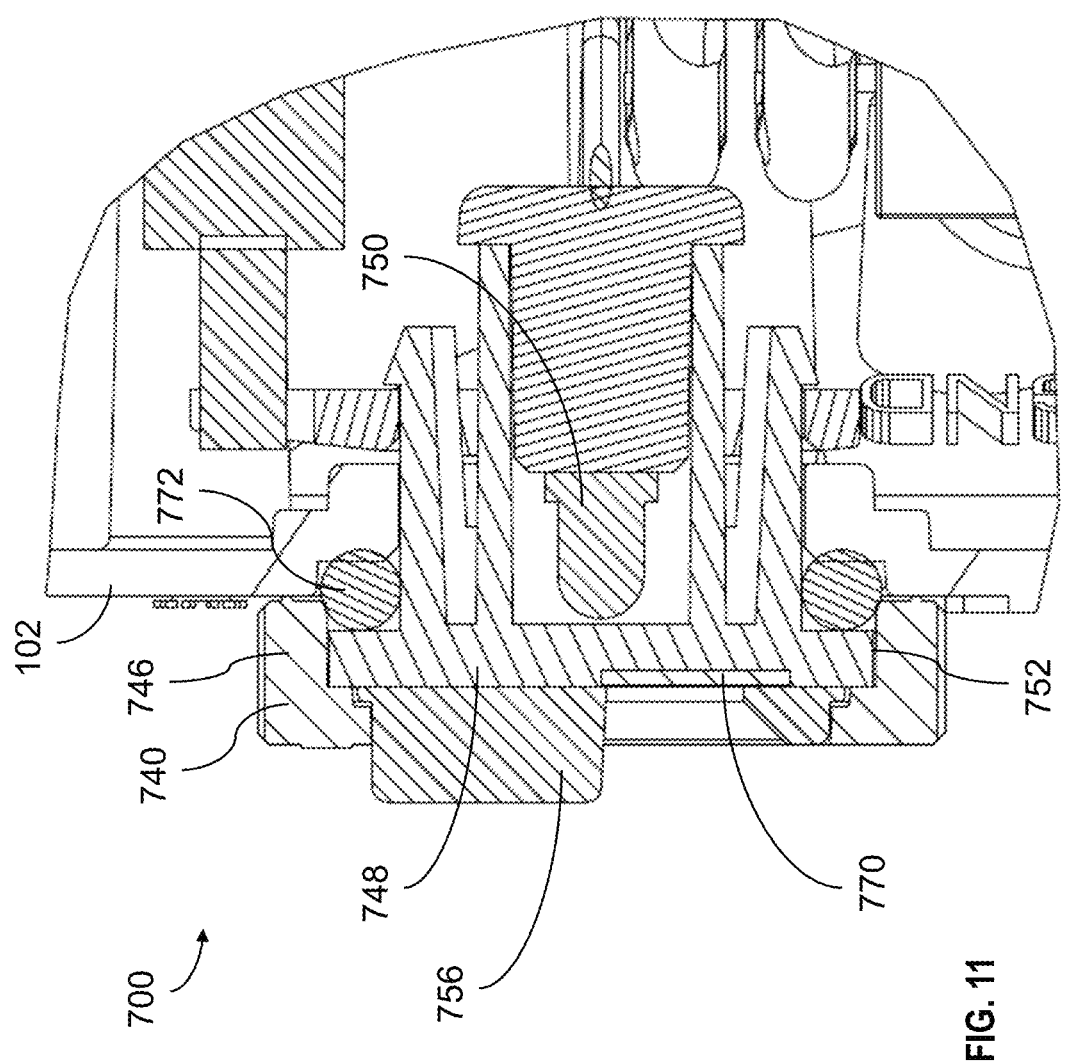
FIG. 11 is a sectional view of the light fixture of FIG. 7 taken from circle 11 in FIG. 10

The light fixture 700 with the multi-functional adjustment dial 740 may provide a more compact installation for sensors and/or adjusters of the light fixture 700, and may also minimize potential entry points for water, debris, and/or other environmental contaminants into the light fixture 700. As a non-limiting example, compared to the light fixture 100 with three separate openings in the housing 102 for a light sensor, an activation adjuster, and a brightness adjuster, the light fixture 700 has a single opening that accommodates the multi-functional adjustment dial 740 and thus all three. Optionally, and as best illustrated in FIG. 11, a sealing member 772 may be provided with the multi-functional adjustment dial 740 to provide a seal between the multi-functional adjustment dial 740 and the housing 102 and to further minimize potential entry of water or other debris into the light fixture 700.

Figure 14:
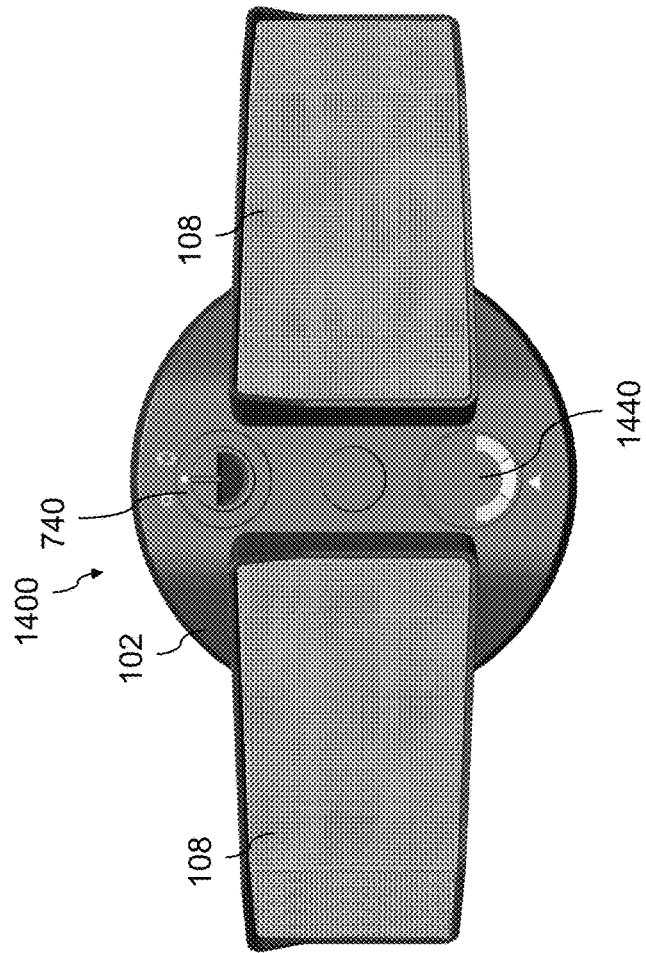
FIG. 14 illustrates a light fixture according to embodiments of the disclosure.

FIG. 14 illustrates an example of another light fixture 1400 according to various embodiments. The light fixture 1400 is substantially similar to the light fixture 700 except that the light modules 108 have a different profile, and the light fixture 1400 includes a color temperature adjuster 1440 in addition to the multi-functional adjustment dial 740.

Figure 15:
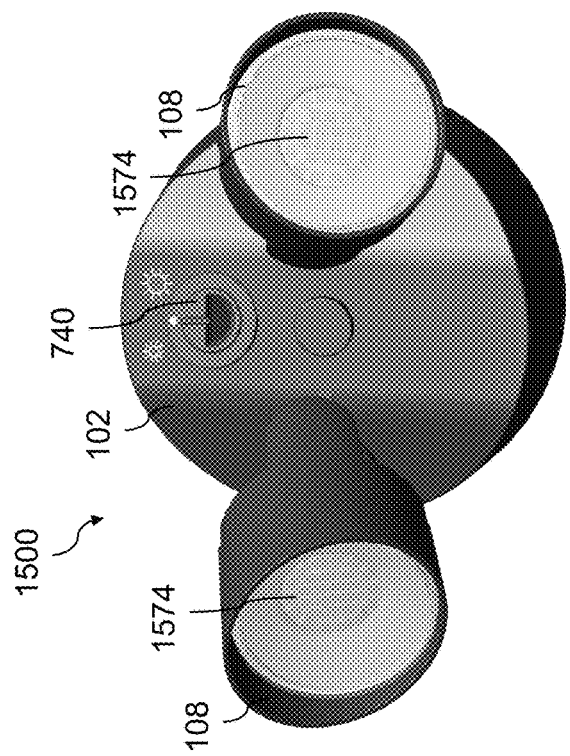
FIG. 15 illustrates a light fixture according to embodiments of the disclosure.

FIG. 15 illustrates an example of another light fixture 1500 according to various embodiments. The light fixture 1500 is substantially similar to the light fixture 700 except that the light modules 108 are fixed relative to the housing 102. FIG. 15 also illustrates an example of first light sources 1574 on each of the light modules 108.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive: and the disclosure not limited to these example illustrations but rather encompasses all possible modifications and variations within the scope of the issued claims and their equivalents.

Illustration 1. A light fixture comprising: a housing: a light source supported on the housing, wherein the light source is capable of having at least two output levels: a sensor on the housing configured to detect an amount of light external to the light fixture and generate an activation signal for the light source based on the detected light being within a predefined activation range, wherein the predefined activation range is adjustable: and an adjuster on the housing and communicatively coupled to the light source and the sensor, the adjuster comprising a first adjustment dial configured to control the output level of the light source and a second adjustment dial configured to control the activation range of the sensor.

Illustration 2. The light fixture of any preceding or subsequent illustrations or combination of illustrations, wherein the first adjustment dial is rotatable independently from the second adjustment dial.

Illustration 3. The light fixture of any preceding or subsequent illustrations or combination of illustrations, wherein the first adjustment dial surrounds at least a portion of an outer perimeter of the second adjustment dial.

Illustration 4. The light fixture of any preceding or subsequent illustrations or combination of illustrations, wherein the first adjustment dial surrounds the entire outer perimeter of the second adjustment dial.

Illustration 5. The light fixture of any preceding or subsequent illustrations or combination of illustrations, wherein the first adjustment dial is adjustable between a first output level and a second output level, wherein the first output level of the light source is greater than the second output level of the light source.

Illustration 6. The light fixture of any preceding or subsequent illustrations or combination of illustrations, wherein the second adjustment dial is adjustable between a night activation range, a dusk-til-dawn activation range, and a daytime activation range.

Illustration 7. The light fixture of any preceding or subsequent illustrations or combination of illustrations, wherein the light source is capable of displaying at least a first color temperature and a second color temperature, and wherein the light fixture further comprises a color adjuster on the housing communicatively coupled to the light source and configured to control the light source between the first color temperature and the second color temperature.

Illustration 8. The light fixture of any preceding or subsequent illustrations or combination of illustrations, wherein the color adjuster is a dial, and wherein the first color temperature and the second color temperature are within a range from 2700K to 5000K, inclusive.

Illustration 9. The light fixture of any preceding or subsequent illustrations or combination of illustrations, wherein the sensor comprises a photocell.

Illustration 10. The light fixture of any preceding or subsequent illustrations or combination of illustrations, wherein the light source is a first light source, wherein the housing comprises an installation cavity comprising an opening, and wherein the light fixture further comprises: a second light source supported within the installation cavity: a motion sensor supported within the installation cavity: and an optic connected to the housing and covering the opening of the installation cavity.

Illustration 11. A light fixture comprising: a housing comprising an installation cavity, the installation cavity comprising an opening: a first light source supported on the housing and outside of the installation cavity: a second light source supported within the installation cavity: a motion sensor supported within the installation cavity: and an optic connected to the housing and covering the opening of the installation cavity.

Illustration 12. The light fixture of any preceding or subsequent illustrations or combination of illustrations, wherein the motion sensor is an infrared sensor.

Illustration 13. The light fixture of any preceding or subsequent illustrations or combination of illustrations, wherein a light output of the second light source is less than a light output of the first light source.

Illustration 14. The light fixture of any preceding or subsequent illustrations or combination of illustrations, wherein the housing comprises a support extending into the installation cavity, wherein the first light source comprises a light board comprising at least one light emitting diode, and wherein the light board is supported on the support.

Illustration 15. The light fixture of any preceding or subsequent illustrations or combination of illustrations, wherein the support divides the installation cavity into a first installation space and a second installation space, wherein the opening provides access to the first installation space, and wherein the second light source and the motion sensor are supported in the first installation space.

Illustration 16. The light fixture of any preceding or subsequent illustrations or combination of illustrations, wherein the optic seals the installation cavity.

Illustration 17. The light fixture of any preceding or subsequent illustrations or combination of illustrations, further comprising a base and a seal, wherein the housing is connected to the base, wherein the housing and the base together define the installation cavity, and wherein the seal is between the base and the housing and seals the installation cavity.

Illustration 18. The light fixture of any preceding or subsequent illustrations or combination of illustrations, further comprising at least one of: an output level adjuster communicatively coupled to the first light source and configured to control an output level of the first light source: a color temperature adjuster communicatively coupled to the first light source and configured to control a color temperature of the first light source: or an activation adjuster and sensor communicatively coupled to the first light source and the second light source and configured to control an activation of the first light source and the second light source based on a detected amount of external light.

Illustration 19. The light fixture of any preceding or subsequent illustrations or combination of illustrations, wherein the optic is a fresnel type optic.

Illustration 20. The light fixture of any preceding or subsequent illustrations or combination of illustrations, wherein the first light source is capable of having at least two output levels, and wherein the light fixture further comprises: a sensor on the housing configured to detect an amount of light external to the light fixture and generate an activation signal for the first light source based on the detected light being within a predefined activation range, wherein the predefined activation range is adjustable; and an adjuster on the housing and communicatively coupled to the first light source and the sensor, the adjuster comprising a first adjustment dial configured to control the output level of the first light source and a second adjustment dial configured to control the activation range of the sensor.

The above-described aspects are merely possible examples of implementations, merely set forth for a clear understanding of the principles of the present disclosure. Many variations and modifications can be made to the above-described example(s) without departing substantially from the spirit and principles of the present disclosure. All such modifications and variations are included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed is:

1. A light fixture comprising:
   a housing;
   a light source supported on the housing, wherein the light source is capable of having at least two output levels;
   a sensor on the housing configured to detect an amount of light external to the light fixture and generate an activation signal for the light source based on the detected light being within a predefined activation range, wherein the predefined activation range is adjustable; and
   an adjuster on the housing and communicatively coupled to the light source and the sensor, the adjuster comprising a first adjustment dial configured to control the output level of the light source and a second adjustment dial configured to control the activation range of the sensor, wherein the first adjustment dial surrounds at least a portion of an outer perimeter of the second adjustment dial,
   wherein the first adjustment dial surrounds at least a portion of an outer edge of the sensor, and
   wherein the sensor further includes a lens positioned in a portion of the second adjustment dial.

2. The light fixture of claim 1, wherein the light source is capable of displaying at least a first color temperature and a second color temperature, and wherein the light fixture further comprises a color adjuster on the housing communicatively coupled to the light source and configured to control the light source between the first color temperature and the second color temperature.

3. The light fixture of claim 2, wherein the color adjuster is a dial, and wherein the first color temperature and the second color temperature are within a range from 2700K to 5000K, inclusive.

4. The light fixture of claim 1, wherein the first adjustment dial is rotatable independently from the second adjustment dial.

5. The light fixture of claim 1, wherein the first adjustment dial surrounds the entire outer perimeter of the second adjustment dial.

6. The light fixture of claim 1, wherein the first adjustment dial is adjustable between a first output level and a second output level, wherein the first output level of the light source is greater than the second output level of the light source.

7. The light fixture of claim 1, wherein the second adjustment dial is adjustable between a night activation range, a dusk-til-dawn activation range, and a daytime activation range.

8. The light fixture of claim 1, wherein the sensor comprises a photocell.

9. The light fixture of claim 1, wherein the light source is a first light source, wherein the housing comprises an installation cavity comprising an opening, and wherein the light fixture further comprises:
   a second light source supported within the installation cavity;
   a motion sensor supported within the installation cavity; and
   an optic connected to the housing and covering the opening of the installation cavity.

10. The light fixture of claim 1, wherein the sensor and adjuster are positioned within a single opening in the housing.

* * * * *